United States Patent
Woolf et al.

(10) Patent No.: US 7,523,212 B2
(45) Date of Patent: Apr. 21, 2009

(54) SYSTEM AND METHOD FOR CONFIGURING A COMPUTER ACCORDING TO A DETECTED NETWORK

(75) Inventors: Susan D. Woolf, Seattle, WA (US); Roland L. Fernandez, Woodinville, WA (US); Wistar D. Rinearson, Redmond, WA (US); Bradford W. Gillespie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 10/790,333

(22) Filed: Mar. 1, 2004

(65) Prior Publication Data
US 2005/0193100 A1  Sep. 1, 2005

(51) Int. Cl.
*G06F 15/16* (2006.01)
*G06F 15/173* (2006.01)
(52) U.S. Cl. .................. 709/230; 709/219; 709/220; 709/223; 709/225
(58) Field of Classification Search .......... 709/223, 709/224, 230
See application file for complete search history.

(56) References Cited

U.S. PATENT DOCUMENTS

| | | | |
|---|---|---|---|
| 2003/0135596 A1* | 7/2003 | Moyer et al. | 709/223 |
| 2003/0163581 A1* | 8/2003 | Moran et al. | 709/235 |
| 2004/0153548 A1* | 8/2004 | Latvakoski et al. | 709/228 |
| 2005/0044215 A1* | 2/2005 | Cohen et al. | 709/224 |

OTHER PUBLICATIONS

Verbyla, J., and H. Ashman, "A User-Configurable Hypermedia-Based Interface Via the Functional Model of the Link," *Hypermedia* 6(3):193-208, 1994.

* cited by examiner

*Primary Examiner*—Nathan Flynn
*Assistant Examiner*—Jude J Jean Gilles
(74) *Attorney, Agent, or Firm*—Amin, Turocy & Calvin, LLP

(57) ABSTRACT

A networked computing environment in which a computing device is configured according to configuration information associated with a detected communication network is presented. As a computer detects a change in the network to which it is connected, the computer obtains configuration information associated with the newly detected network. According to the configuration information, the computer is configured such that some computer functions are presented and/or made available and accessible, while other computer functions are hidden and/or made unavailable and inaccessible.

23 Claims, 8 Drawing Sheets

SYSTEM AND METHOD FOR CONFIGURING A COMPUTER ACCORDING TO A DETECTED NETWORK

FIELD OF THE INVENTION

The present invention relates to computer systems, and in particular, configuring a computer according to a detected network.

BACKGROUND OF THE INVENTION

Portable computers have made great advances in recent years. Computer manufacturers have produced portable computers that are lightweight yet extremely powerful. Indeed, many portable computers are advertised as desktop replacements and include features that rival those of traditional desktop machines.

In addition to advances in portable computers, network/component providers have made great advances in network access. Where just a few years ago a computer modem was considered an optional accessory to a computer, that was purchased at an additional cost, today's computers come equipped not only with a computer modem, typically integrated with the system, but also equipped with a network interface. Additionally, many computers, especially portable computers, are equipped with both wired and wireless integrated network interfaces. Typically, the wireless network interfaces are designed to take advantage of the ubiquitous IEEE 802.11 wireless network protocols.

Through a wireless network interface, a portable computer can achieve a real measure of portability. For example, as a portable computer, equipped with a wireless network interface, is moved from one area to another the wireless network interface detects the broadcast signals of the various wireless networks, also referred to as cells or hot spots, and automatically communicates with the detected networks.

As this wireless networking trend has advanced, much attention has been placed on maintaining a static computer configuration as the portable computer is moved between the various networks. In other words, substantial effort has been expended in ensuring that as a portable computer moves from one network to another, the change in network connection is non-disruptive to the computer's configuration, and thus, transparent to the user. For example, to be transparent to a user, computer services and functionality available while connected to a first network must be maintained when subsequently connected to a second network.

In spite of the efforts to ensure that a computer's configuration maintains services between changes in networks, in some situations it is not always desirable to maintain a static computer configuration. Indeed, in some instances, it would be very useful to adapt the computer's configuration according to a detected network. For example, as computers, such as notebooks (also frequently referred to as laptops), tablet computers, and personal digital assistants (PDAs), become standard equipment for students, it is not always desirable to maintain static configurations. Particularly, a student may have various games, music, chat programs, and the like installed on a tablet computer that is also used in school. Clearly, a teacher would not want that student playing games or music, or communicating with another person via an Internet chat program on the computer while the student is supposed to be studying. Instead, a teacher may wish to establish a set of features that are available to students connected to a network while they are in class.

In light of the above scenario, what is needed is a system and method for automatically configuring a computer according to predetermined configuration information associated with a detected network. This, as well as other issues, is addressed in the present invention.

SUMMARY OF THE INVENTION

In accordance with aspects of the present invention, a networked computing environment for automatically configuring a computing device according to a detected network is presented. The networked computing environment includes at least one communication network, wherein each communication network is operable to communicate with a plurality of computing devices. The networked computing environment also includes configuration information. Configuration information is associated with a communication network and describes a configuration for each computing device connected to the communication network. The networked computing environment further includes at least one computing device. Each computing device has a network interface for connecting to a communication network. Additionally, the computing device, upon detecting a change to the network connection, obtains configuration information associated with the communication network, and automatically configures itself according to the configuration information.

In accordance with other aspects of the present invention, a networked computing system that automatically configures according to a detected network is presented. The networked computing system includes a processor, a memory, and a network interface for connecting to a communication network. The networked computing system, upon detecting a change to a current connection to a communication network via the network interface, obtains configuration information associated with the current communication network, and automatically configures the network computing system according to the configuration information.

In accordance with yet further aspects of the present invention, a method for automatically configuring a computing device according to a detected network is presented. According to the exemplary method, a change to the computing device's current network connection is detected. Upon detecting the change to the computing device's current network connection, configuration information corresponding to the change in the current network connection is obtained. Subsequently, the computing device is automatically configured according to configuration information.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
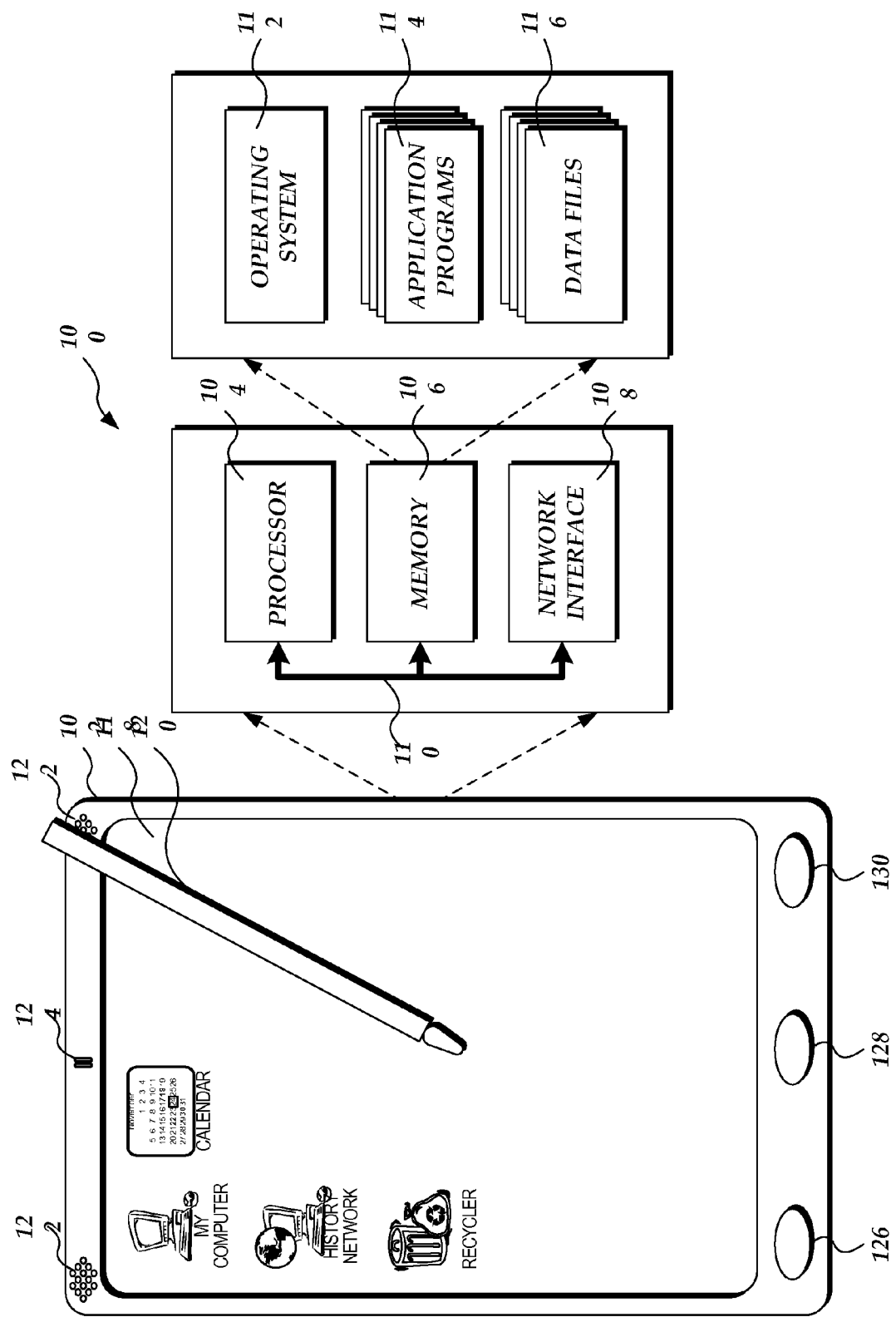
FIG. 1 is a pictorial diagram illustrating an exemplary portable computer suitable for implementing aspects of the present invention.

FIG. 1 is a pictorial diagram illustrating an exemplary portable computer 102 suitable for implementing aspects of the present invention. While the exemplary portable computer 102 will be described in the general context of a tablet computer capable of operating as both a stand-alone and networked computer, those skilled in the art will appreciate that the invention may be practiced with many other types of computer systems, including laptops and PDAs. Additionally, as will be described below, other computer systems that are not typically considered portable computers may be used to implement aspects of the present invention, including more traditional desktop computers.

With reference to FIG. 1, the exemplary portable computer 102, suitable for implementing aspects of the present invention, includes a processing unit 104, a memory 106, and a network interface 108. A system bus 110 interconnects these and other components typically found in a portable computer to the processing unit 104. In fact, those skilled in the art will recognize that an exemplary computer, such as the portable computer 102, will typically include many components not shown in FIG. 1. However, for simplicity and illustration purposes, only the above few components are described.

The memory 106 may be volatile or non-volatile. Non-volatile memory retains its information whether or not a power source is applied. Thus, non-volatile memory includes, but is not limited to, flash memory, read-only memory (ROM), hard drives, optical drives, and other devices for reading information from computer-readable media. Conversely, volatile memory loses stored information when a power source is no longer applied. Volatile memory typically includes processor cache and random access memory (RAM).

As shown in FIG. 1, the memory 106 of the exemplary table computer 102 typically stores information including an operating system 112, one or more application programs 114, and one or more data files 116. Those skilled in the art will appreciate that these three categories of information include numerous types of files and collections of data, such as music data, audio/visual data, text, program data, executable code, and the like, all of which are contemplated as falling with the scope of the present invention.

As mentioned, the portable computer 102 includes a network interface 108 for interfacing with a communication network, network resources, the Internet, and/or other networked computers. Those skilled in the art will appreciate that the network interface 108 may be integrated as part of the portable computer 102, installed as a separate component such as a network interface card, in the portable computer, or attached as an external device to the portable computer. According to one embodiment of the present invention, the network interface 108 is a wireless network interface. While the following discussion will make general reference to communicating with a network over a wireless network interface 108, the present invention should not be construed as limited to wireless network interfaces. Those skilled in the art will readily recognize that a portable computer 102 may also easily change connections from one network to another via a wired network connection.

Many portable computers typically include one or more user input devices, including, but not limited to, a keyboard, a mouse, a touchpad, and the like. Additionally, many portable computers, especially tablet computers and PDAs, have, as a primary user input device, a stylus 120 that is used in conjunction with an input sensitive display module 118. Those skilled in the art will recognize that the input sensitive display module 118 is a combined input and output device. As shown in FIG. 1, the exemplary portable computer 102 is illustrated as a tablet computer with a stylus 120 as the user's primary input device. Those skilled in the art will recognize that the input sensitive display module 118 may be pressure sensitive, or alternatively, tuned to a conforming stylus 120 such that the location of the stylus can be detected by the input sensitive display module when the stylus is in proximity to, but not in actual contact with the input sensitive display module. As yet a further alternative embodiment, the input sensitive display module 118 may be both pressure sensitive and able to detect the location of a conforming stylus 120 with or without actual physical contact.

Those skilled in the art will readily recognize that many other components are included in, or attached to, a portable computer 102 includes audio speakers, a microphone, one or more printers (not shown), and the like. As shown in FIG. 1, the exemplary portable computer 102 includes integrated audio speakers 122 and an integrated microphone 124. Additionally, many portable computers, as well as other more traditional desktop computers, include special function controls, such as controls 126-130 illustrated in FIG. 1, that are programmed by the computer manufacturer as shortcuts to specific functions available on the computer. Often, these special function controls are also user programmable. The functions associated with the special function controls often include opening an email account, browsing the Internet, controlling speaker volume, and the like.

While various components of a portable computer 102 have been illustrated and described, those skilled in the art will readily recognize that a typical computer, suitable for implementing aspects of the present invention, will include many components not described herein. Accordingly, the above description of a portable computer should be viewed as illustrative, and should not be construed as limiting upon the present invention.

Figure 2:
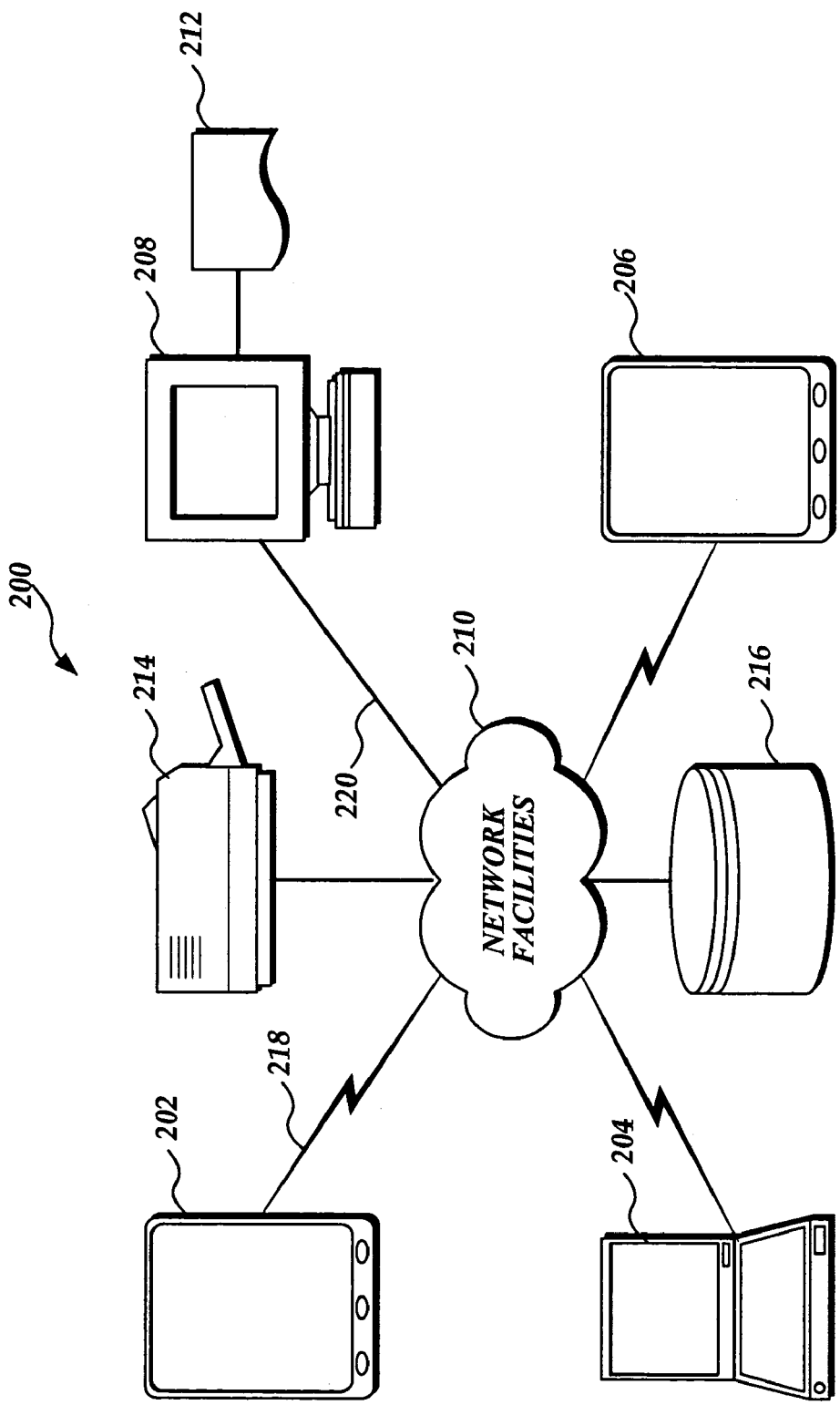
FIG. 2 is a pictorial diagram illustrating an exemplary network suitable for implementing aspects of the present invention.

FIG. 2 is a pictorial -diagram illustrating an exemplary network 200 suitable for implementing aspects of the present invention. The exemplary network 200 includes a plurality of computing devices 202-208 interconnected through network facilities 210. The network facilities 210 may be a single device, such as a network router or hub, or multiple networking devices and components. While a particular network configuration is illustrated in FIG. 2, those skilled in the art will readily recognize that there are numerous network configurations suitable for implementing the present invention. Accordingly, the exemplary network 200 of FIG. 2 should be viewed as illustrative only, and should not be construed as limiting upon the present invention.

As shown in FIG. 2, the network connections of the exemplary network 200 between a computer in the network and the network facilities 210 may include both wireless and wired connections, such as wireless connection 218 and wired connection 220. The exemplary network may also include portable computers, such as portable computers 202-206, as well as more traditional computers (i.e., not typically considered as portable), such as desktop computer 208. Also shown in FIG. 2, the exemplary network 200 may further include various resources or facilities other than computers/computing devices, such as, but not limited to, a network printer 214, a network file server/database 216, and the like.

In accordance with the present invention, associated with each network in which a computer is automatically configured as it is connected is configuration information 212. The configuration information 212 includes predetermined information used to automatically configure the computer when a network connection is newly detected. For example, the configuration information 212 may include, but is not limited to, relating to the following: applications that may be accessible/available while connected to the network; applications are to be inaccessible/unavailable while connected to the network; configuring available applications to operate optimally according to the detected network; computer system favorites; associated projects; network resources that are and are not available while connected to the network; local hardware devices that should be enabled/disabled while connected to the network; user interface presentation themes including system colors, thematic music and sounds, and the arrangement of application and resource icons on the display screen; and background images. Those skilled in the art will recognize that numerous other aspects of a computer's configuration may also be included in the configuration information 212, all of which are contemplated as falling within the scope of the present invention.

Configuration information 212 may be unique per each computer connected to a network. Additionally, configuration information 212 may also be unique per each current user of a particular computer. Still further, configuration information 212 may be organized in a hierarchical manner. For example, a school location may have a predetermined base configuration, and each network or sub-network, perhaps corresponding to a particular class such as mathematics, history, or language arts, may build upon the base configuration by adding additional elements, all the while remaining within the predetermined base configuration established for the school location.

According to certain aspects of the present invention, configuration information 212 may identify computer features that must be available/accessible, and computer features that must not be available/accessible. Additionally, configuration information 212 may include an indication as to whether computer features not specifically identified in the configuration information may be available/accessible, or may not be available/accessible. Criteria other than a recitation of computer resources may also be included in the configuration information for determining which computer features are to be available, and which are not.

As shown in FIG. 2, the exemplary network 200 includes configuration information 212 found on computer 208. However, storing the configuration information 212 off of computer 208 is for illustration purposes only. Configuration information may be physically stored on a file storage location on the network, such as the network file server/database 216, individually on each computer connected to the network, on a permanent network computer, such as computer 208. Additionally, the configuration information may be stored as a single file, or as a collection of files, either located together or distributed throughout the network.

In addition to configuration information associated with a detected network, according to aspects of the present invention, each computer adapted to the present invention may include default configuration information (not shown) that specifies how the computer is to be configured when there is no current network connection, or when the computer is connected to a network that is not adapted to the present invention. In contrast to configuration information associated with a network, default configuration information must be stored on the user's computer.

Figure 3:
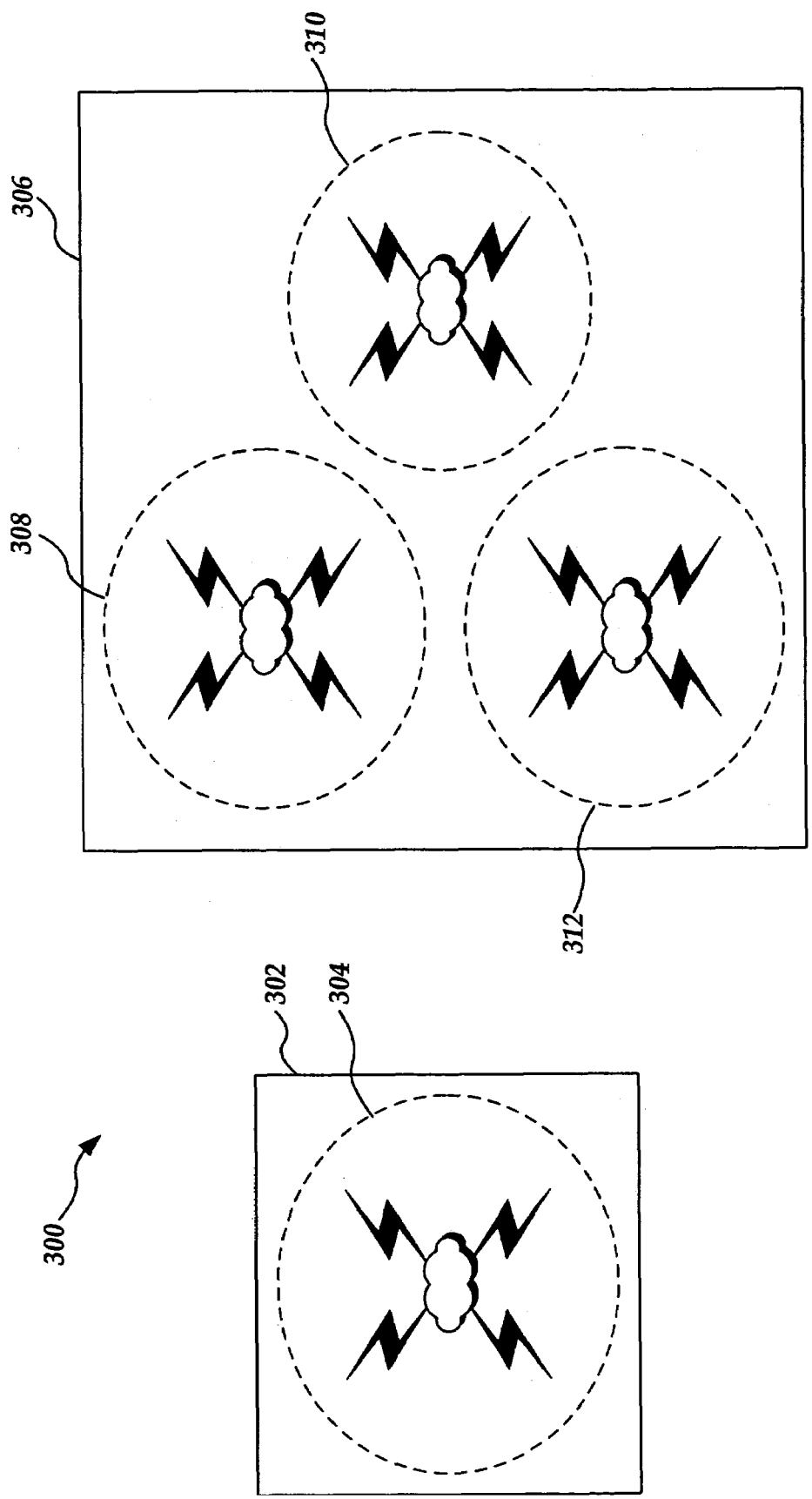
FIG. 3 is a pictorial diagram illustrating an exemplary networked environment, including multiple networks, suitable for implementing aspects of the present invention.

Though the present invention may be advantageously utilized in an environment with only one network (and also including a non-networked/default area), the present invention is more advantageously utilized in an environment including multiple networks. FIG. 3 is a pictorial diagram illustrating an exemplary networked environment 300, including a plurality of networks, suitable for implementing aspects of the present invention. With regard to FIG. 3, the following discussion assumes that each of the plurality of networks is a wireless network. However, this is for illustration purposes only, and should not be construed as limiting upon the present invention.

As mentioned above, portable computers are frequently moved from one location to another, and frequently encounter different networks. FIG. 3 includes two general locations, a home location 302 and a school location 306. The home location includes a home network 304, while the exemplary school location 306 includes multiple networks, networks 308-312. The multiple networks 308-312 may correspond to individual networks, or sub-networks associated with particular classrooms within the school, or overlapping wireless networks or sub-networks related to particular subjects. For example, school network 308 may correspond to a mathematics class/classroom, while school network 310 may correspond to a history class/classroom. It should be appreciated that these are simply illustrative examples, and should not be construed as limiting upon the present invention. As an alternative aspect of the present invention, each school network may be associated with multiple sets of configuration information, and user computers are automatically configured according to a particular configuration selection performed by an instructor at periodic times during the day.

As a user/student moves the portable computer from one location to another, particularly, from the home location 302 to the school location 306, and while at school, from one class to another, different networks may be encountered (including no network.) As mentioned above, according to the present invention, as a network is encountered or a connection to a network is detected, the user's computer obtains the configuration information associated with the network, and upon successfully obtaining that information, automatically configures itself according to the obtained configuration information. Thus, as a student moves from the home network 304 into a non-networked area, from that non-networked area to the school location 306 and a classroom with school network 308, and then from a classroom where school network 308 associated with mathematics is broadcast, to a classroom where school network 312 associated with English is broadcast, the students computer, such as portable computer 102, automatically configures/reconfigures itself according to the detected network (or lack thereof). FIGS. 4-7 are pictorial diagrams illustrating how a portable computer 102 may be configured according to a detected network.

Figure 4:
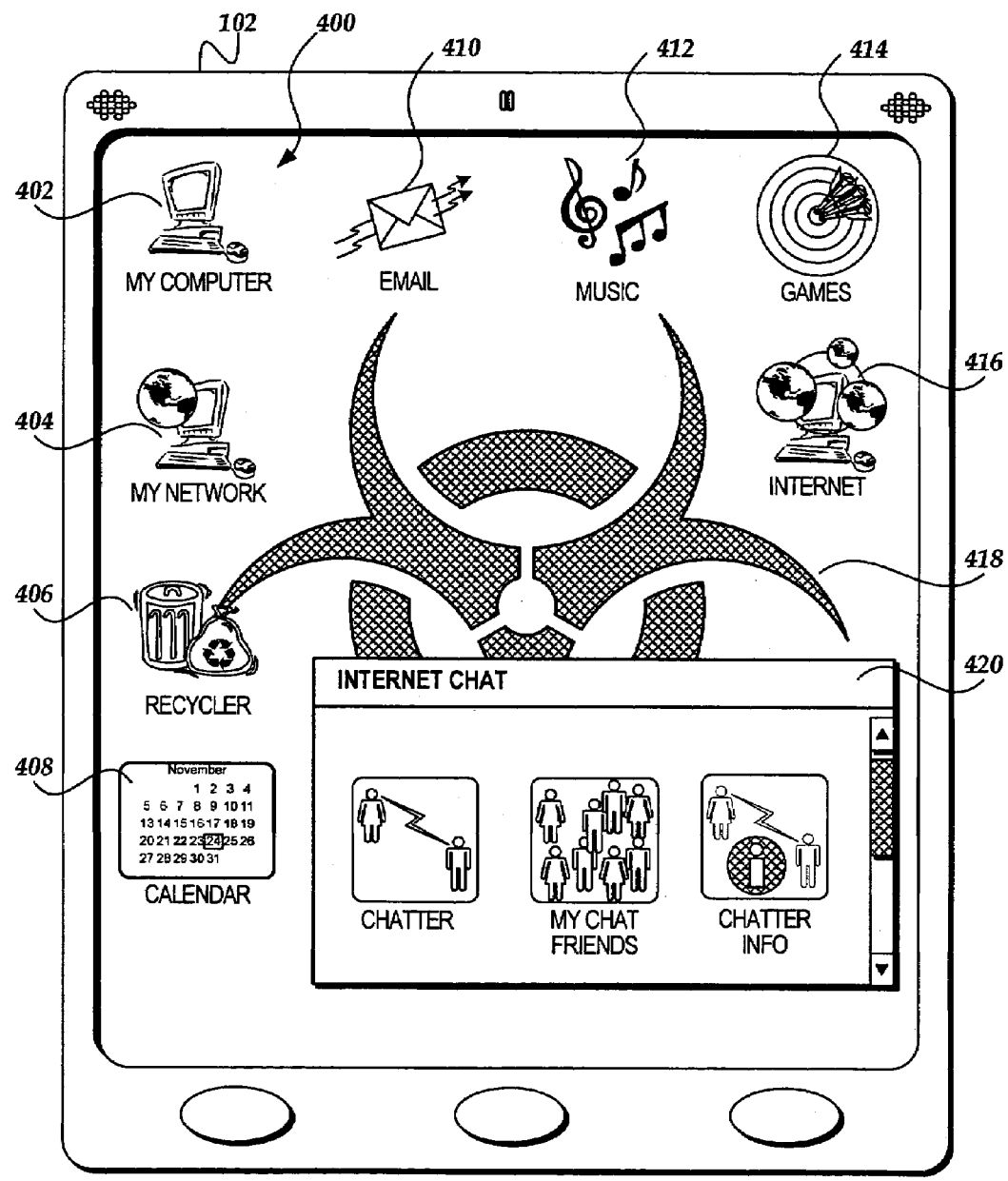
FIG. 4 is a pictorial diagram illustrating an exemplary user interface configured according to a default configuration.

FIG. 4 is a pictorial diagram illustrating an exemplary user interface 400 of a portable computer 102 configured according to predetermined configuration information associated with a detected home network, such as home network 304 (FIG. 3). According to aspects of the present invention, a home network configuration (or any other configuration) may double as the default configuration described above. Alternatively, a default configuration may be defined specifically for those instances when the portable computer 102 is not connected to, or prohibited from fully connecting to, a particular network. For purposes of the following discussion, computer features include both hardware and software system services, computer files, software applications, network connections, network resources, and the like. Additionally, while user interface icons represent computer features, but are not actually the computer features themselves, for purposes of the following discussion, the icons will be referred to as the features themselves.

As shown in FIG. 4, the home network configuration includes general system features 402-406 on the user interface screen 400. As mentioned above, the general system features 402-406 may be specifically identified as available/accessible in the configuration information, or alternatively, not specifically excluded in the configuration information. Other features shown as part of the home network, or default, configuration include a calendar feature 408, an email feature 410, a music player feature 412, a games folder 414, a Web browser 416, an Internet chat feature 420, and a background feature 418. As can be seen, many of these features are items that include entertainment, social interaction, or that reflect a personalization of the portable computer 102, all of which may be permissible in a home network configuration, but which may also be inappropriate if used at particular times, or in particular circumstances, such as playing music or games during a mathematics class at school.

According to aspects of the present invention, in addition to configuring the portable computer 102 according to a detected network, configuration information 212 may also include additional conditional criteria for configuring the portable computer 102. For example, in addition to configuring the portable computer 102 according to a newly detected network, additional criteria may control the configuration according to specific days of the week, time of day, or other conditions, such as whether a homework assignment, is or is not completed. The additional criteria may prevent games from being played on the tablet computer 102 during specific hours of the day. Clearly, configuration information 212 may be organized in innumerable ways to achieve desired computer configurations, and the above examples are for illustration purposes only, and should not be construed as limiting upon the present invention.

Figure 5:
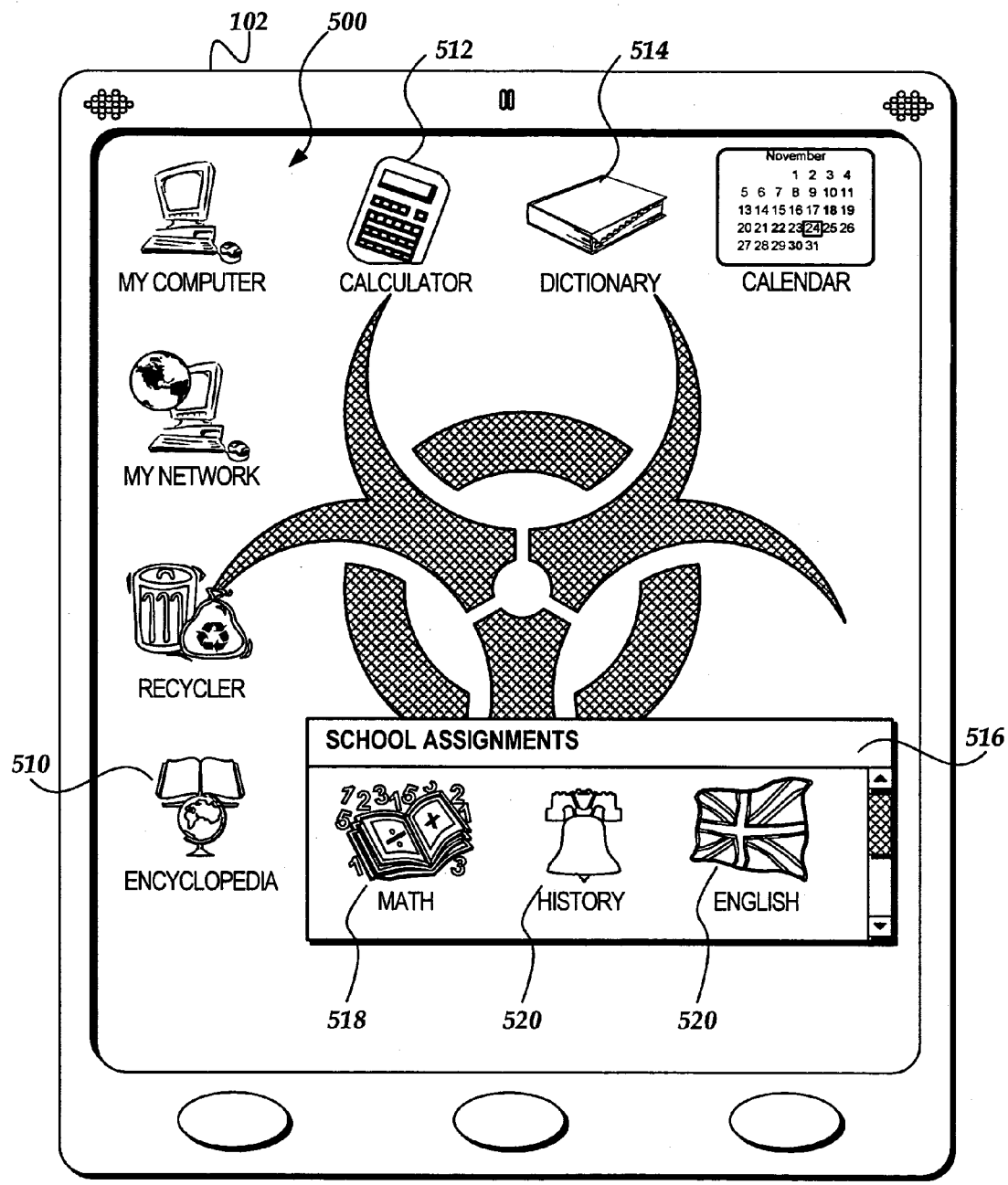
FIG. 5 is a pictorial diagram illustrating an exemplary user interface configured according to a home network configuration.

FIG. 5 is a pictorial diagram illustrating an exemplary user interface 500 of a tablet computer 102 configured according to predetermined configuration information associated with a home network 304, including additional criteria associated with school assignments. The exemplary user interface 500 shares many similarities to the user interface 400 of FIG. 4, except that, according to this particular configuration, the email feature 410, music player feature 412, games folder 414, Web browser feature 416, and the Internet chat feature 416 have been removed, and replaced with features associated with the school assignments, represented by icons 514-522. These features include an encyclopedia feature 510, a calculator feature 512, a dictionary feature 514, and a school assignment window 516 including, a mathematics assignment 518, a history assignment 520, and an English assignment 522.

Figure 6:
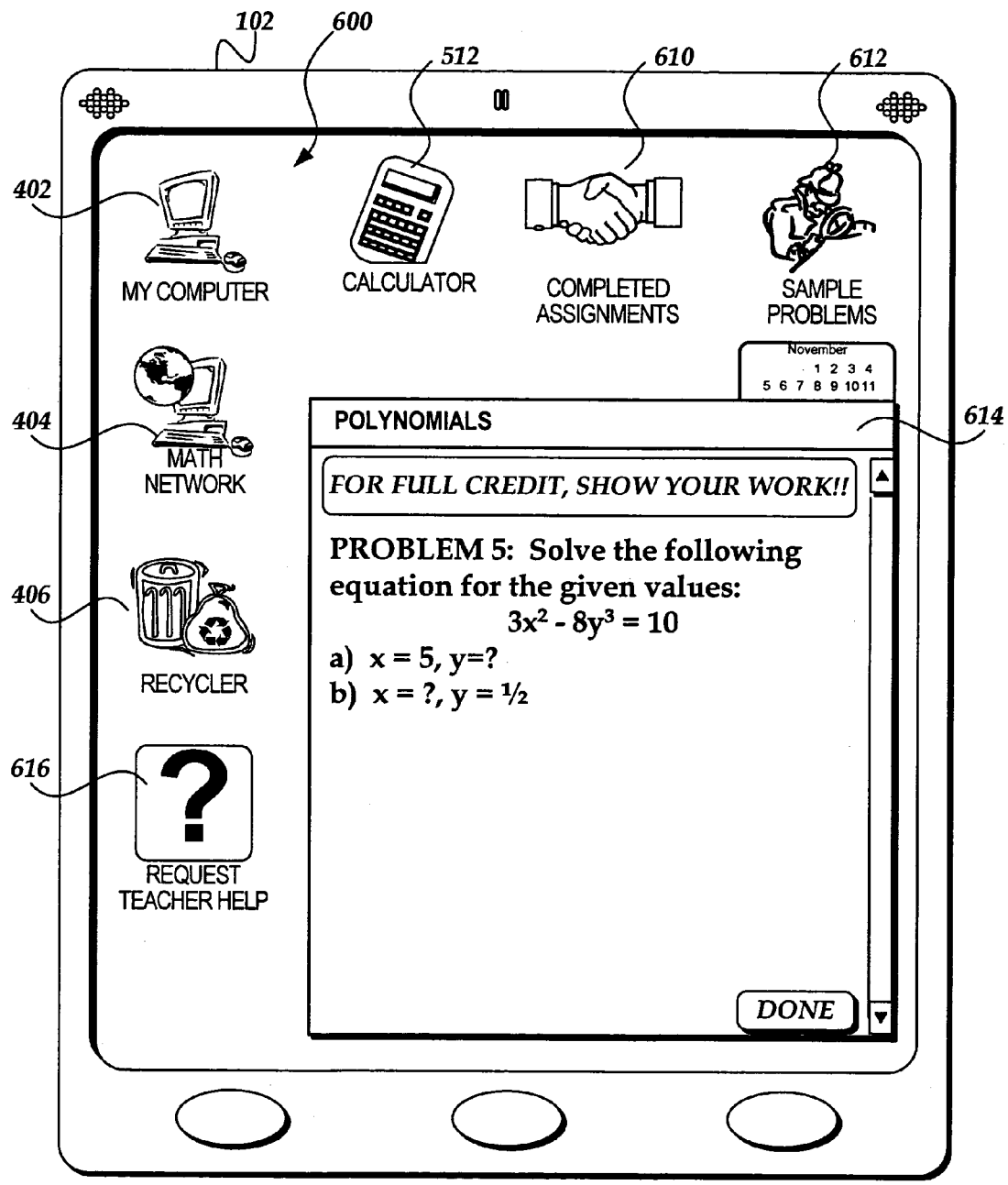
FIG. 6 is a pictorial diagram of a user interface configured according to a mathematics class configuration.

As already discussed, as a portable computer 102 is moved from one location to another, such as from the home location 302 to the school location 306, the portable computer automatically is configured according to configuration information associated with the newly detected network. FIG. 6 is a pictorial diagram of an exemplary user interface 600 configured according to configuration information associated with a school network, such as school network 308, for a mathematics class. As shown in FIG. 6, the general system features 402-406 are available on the user interface 600. Additionally, other features, selected for a particular subject matter associated with the school network, are presented on the user interface 600, including a calculator feature 512, a completed assignments folder 610, a sample problems folder 612, a current assignment feature 614, and a request teacher help feature 616. As a further illustration, the background image 420 found in FIGS. 4 and 5 is not present, illustrating that, according to the present invention, some computer features may be excluded, or in other words, not be made available according to a set of configuration information.

Figure 7:
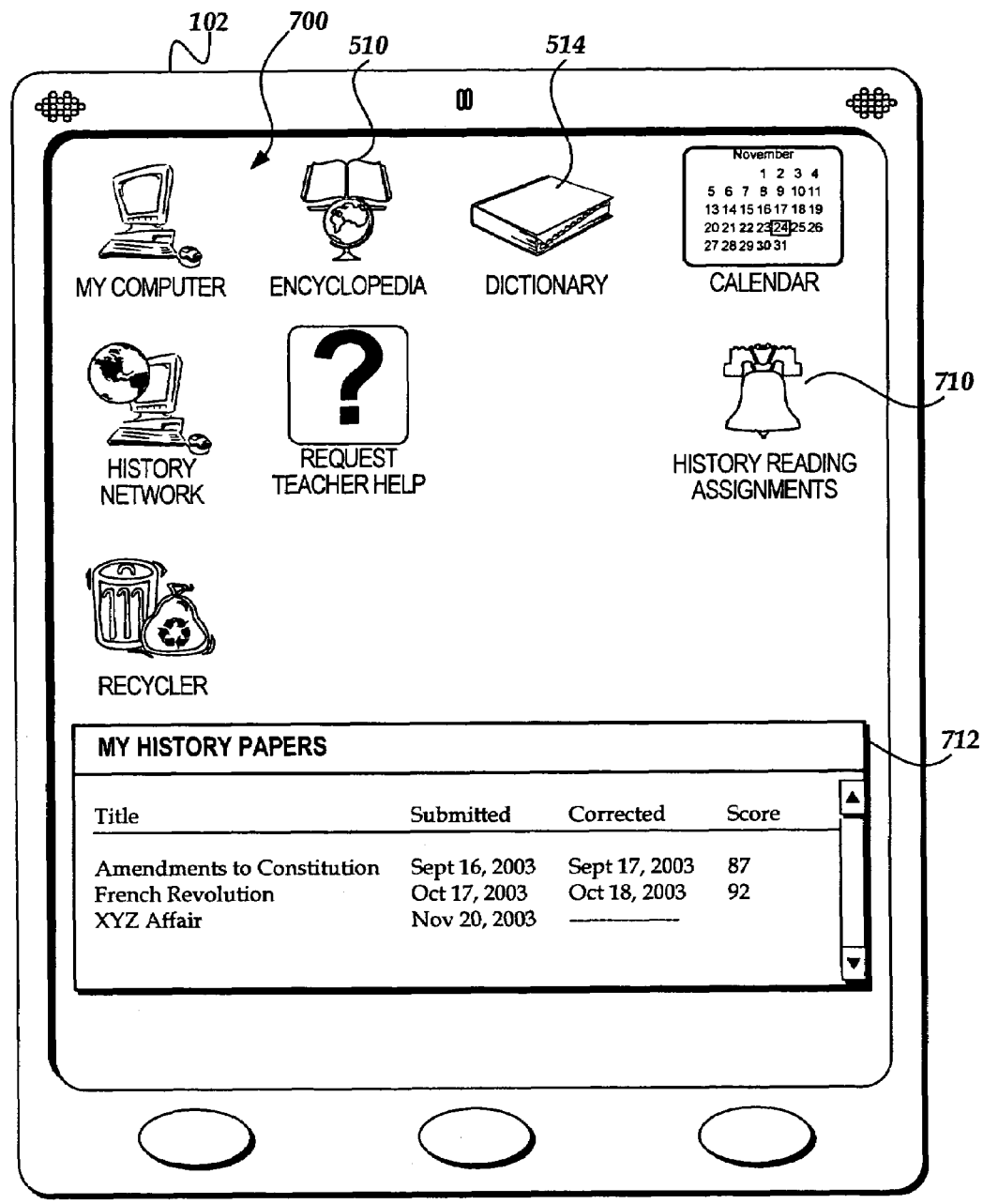
FIG. 7 is a pictorial diagram of a user interface configured according to a history class configuration.

FIG. 7 is a pictorial diagram of an exemplary user interface 700 configured according to a configuration information associated with a school network, such as school network 310, for a history class. While similar to the configuration described in FIG. 6, the user interface 700 includes icons representing an encyclopedia feature 510, a dictionary feature 514, reading assignments feature 710, and a history papers feature 712.

It should be understood that the configurations shown in FIGS. 4-7 are for illustration purposes only, and should not be construed as limiting upon the present invention. Additionally, while the above examples are generally described in terms of a student and school networks, this too is for illustration purposes, and should not be construed as limiting upon the present invention. The present invention may be utilized in any number of environments in which a computer frequently must connect to another network, all of which are anticipated as falling within the scope of the present invention.

Figure 8:
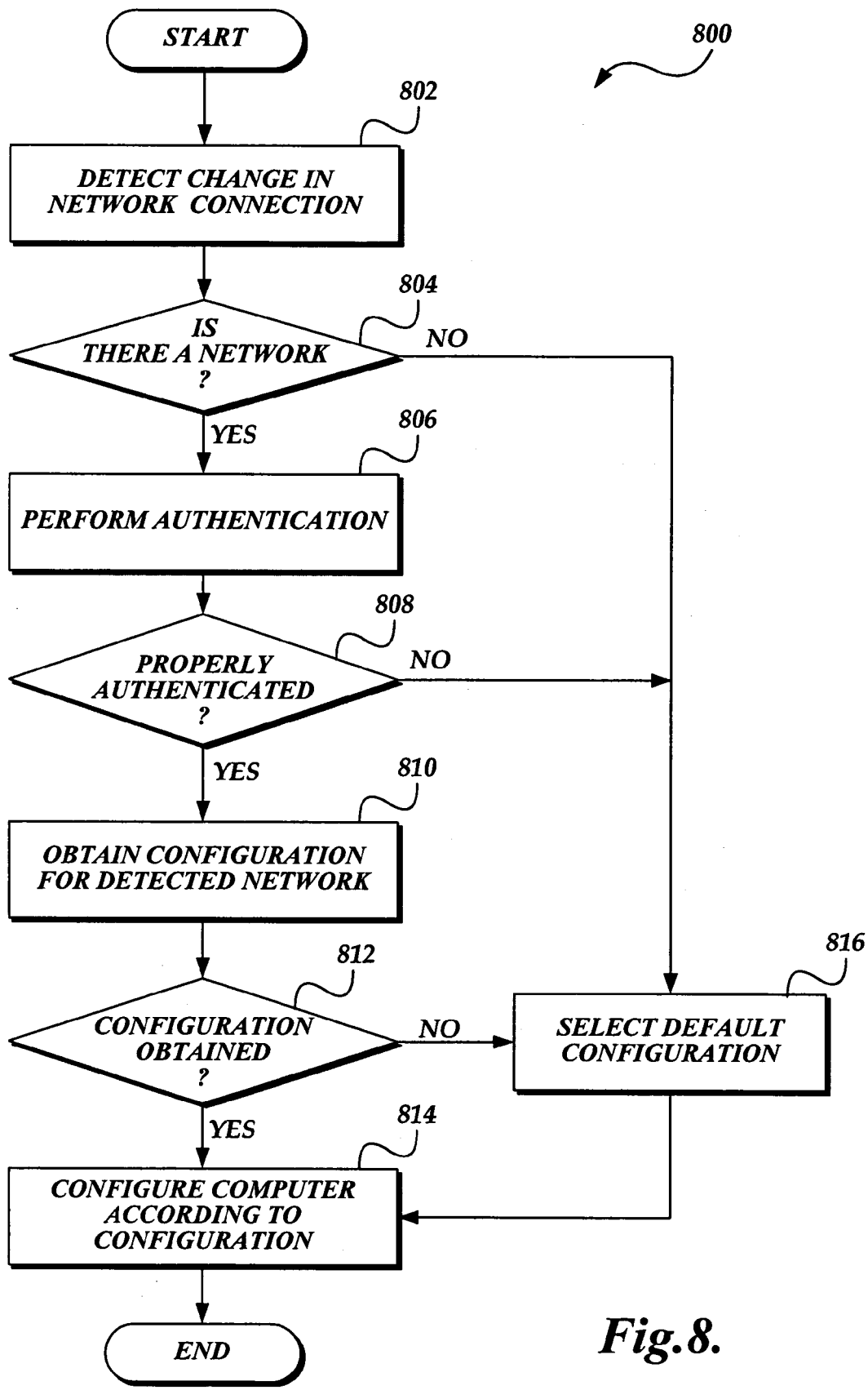
FIG. 8 is a flow diagram illustrating an exemplary method for configuring the user interface of a computer according to a detected network in accordance with the present invention.

FIG. 8 is a flow diagram illustrating an exemplary routine 800 for configuring a computing device according to a detected network. Beginning at block 802, the computing device detects a change in its current network connection. Detecting a change to the current network status may mean that the computing device has detected a change from one network to another, from a current network to detecting no network, or from having no network connection to a network. Further, this change may also occur as a signal is broadcast over the network to which a computing device is currently connected, indicating that the computing device should be reconfigured according to other configuration information.

After detecting a change to the current network connected, at decision block 804, a determination is made as to whether the computing device is connected to a network. If the computing device is connected to a network, at block 806, an authentication step is performed. According to the present invention, the authentication step has at least two aspects: authenticating whether the detected network is one to which the computing device may connect; and authenticating the computing device's user on the detected network. According to one embodiment, the authentication step is an optional step.

At decision block 808, a determination is made as to whether the network and user were properly authenticated. If the detected network and computer device's user were properly authenticated, at block 810, the computing device obtains, or attempts to obtain, configuration information for the newly detected network. As described above, the configuration information may be stored on the newly detected network, in one or more locations on the network. Alternatively, the configuration information may be locally stored on the computing device. As yet a further alternative, the configuration information be stored in locations both on the network and on the computing device.

At decision block 812, a determination is made as to whether the configuration information associated with the newly detected network was obtained. If the configuration information associated with the detected network was obtained, at block 814, the computing device is configured according to the obtained configuration information. Thereafter, the routine 800 terminates.

With reference again to decision block 804, if the computing device is not connected to a network, at block 816, the default configuration information is obtained. As described above, according to one embodiment of the present invention, default configuration information is stored on the computer so that it is accessible when the computing device is not connected to a network. After obtaining the default configuration information, at block 814, the computing device is configured according to the obtained (default) configuration information. Thereafter, the routine 800 terminates.

With reference to decision block 808, if the network and the computer user are not properly authenticated, at block 816, the default configuration information, described above, is selected. Thereafter, at block 814, the computer is configured according to the default configuration information, and the routine 800 terminates.

With reference to decision block 812, if configuration information associated with the detected network is not obtained, at block 816, the default configuration information, described above, is obtained. Thereafter, at block 814, the computer is configured according to the obtained default configuration information, and the routine 800 terminates.

While the present invention has been described above in terms of configuring a computer according to a detected network, it should be appreciated that a change in computer configuration may be triggered by other factors besides a detected network. For example, in addition to, or as an alternative to, configuring a computer according to a detected network connection, the computer may change configuration according to the specific date and/or time. As another example, a computer may be associated with a location sensing device, such as a global positioning system (GPS), and the configuration of the computer may be triggered by the specific location of the computer. Still further, the computer may be configured according to the detected presence or absence of particular network resources, such as a server or printer, or according to aspects of the detected network connection, such as high or low bandwidth, low latency, whether the network connection is to the Internet, and the like.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A networked computing environment for providing network services to computing devices, the networked computing environment comprising:
   a communication network operable to communicate with a plurality of computing devices; and
   configuration information associated with the communication network, the configuration information describing a configuration for computing devices connected to the communication network;
   wherein the communication network, upon the computing device dynamically establishing a network connection to the communication network, provides the configuration information to the computing device, such that the computing device may automatically configure itself according to the configuration information;
   wherein the computing device is further configured based on the occurrence of a triggering event, the triggering event comprises a predetermined geographical area, a particular date, a particular day of the week and a particular time of day, such that detection of the triggering event initiates configuration information specifically associated with the detected triggering event;
   wherein the configuration information further includes an indicator identifying whether computing device features not specifically identified in the configuration information should or should not be available while the computing device is connected to the communication network, such that the computing device makes available or unavailable computing device features not specifically identified in the configuration information according to the indicator; and
   wherein the computing device, upon detecting that the computing device is no longer connected to the communication network, the computing device configures itself according to default configuration information.

2. The networked computing environment of claim 1, wherein the configuration information includes information identifying computing device features that should be accessible or available while connected to the communication network.

3. The networked computing environment of claim 2, wherein the configuration information further includes information identifying computing device features that should not be accessible or available while connected to the communication network.

4. The networked computing environment of claim 3, wherein the configuration information further includes information indicating whether computing device features not specifically identified in the configuration information and that are otherwise available on the computing device should or should not be accessible or available while connected to the communication network.

5. The networked computing environment of claim 4, wherein the computing device features may include any one of software applications, hardware devices, system services and network services.

6. A computing system that automatically configures according to a detected network, the computing system comprising:
   a processor;
   a memory; and
   a network interface for connecting to a communication network;
   wherein the computing system, upon dynamically establishing a connection to a communication network:
      obtains configuration information associated with the communication network; and
      automatically configures itself according to the configuration information;
   wherein the computing system is further configured based on the occurrence of a triggering event, the triggering event comprises a predetermined geographical area, a particular date, a particular day of the week and a particular time of day, such that detection of the triggering event initiates configuration information specifically associated with the detected triggering event;
   wherein the computing system comprises multiple sets of configuration information that is used to automatically configure the system based on the specific communication network the system is connected to and the detection of triggering events;

wherein the configuration information further includes information indicating whether computing system features not specifically identified in the configuration information should or should not be available while the computing system is connected to the communication network; and wherein the computing system, upon detecting that the computing system is no longer connected to a communication network, the computing system configures itself according to default configuration information stored on the computing system.

7. The computing system of claim 6, wherein the configuration information includes information identifying computing system features that should be available while the computing system is connected to the communication network.

8. The computing system of claim 7, wherein the configuration information further includes information identifying computing system features that should not be available while the computing system is connected to the communication network.

9. The computing system of claim 8, wherein the computing system features may include any one of software applications, hardware devices, system services and network services.

10. A method for automatically configuring a computing device according to a detected network, the method comprising:

detecting a change to the computing device's current network connection;

obtaining configuration information corresponding to the computing device's current network connection;

automatically configuring the computing device according to configuration information;

upon detecting the occurrence of a triggering event, the computing device is automatically configured according to configuration information specifically associated with the triggering event, the triggering event comprises a predetermined geographical area, a particular date, a particular day of the week and a particular time of day;

utilizing multiple sets of configuration information to automatically configure the device based on the specific communication network the device is connected to and the detection of triggering events; and upon detecting that the computing device is no longer connected to a communication network, the computing device configures itself according to default configuration information; and wherein the configuration information further includes an indicator identifying whether computing device features not specifically identified in the configuration information should or should not be available while the computing device is connected to the communication network, and wherein automatically configuring the computing device according to the configuration information further comprises making available or unavailable computing device features not specifically identified in the configuration information according to the indicator while the computing device is connected to the communication network.

11. The method of claim 10, wherein the configuration information includes information identifying computing device features that should be available while the computing device is connected to the communication network, and wherein automatically configuring the computing device according to the configuration information comprises making available those computing device features that should be available while the computing device is connected to the communication network.

12. The method of claim 11, wherein the configuration information further includes information identifying computing device features that should not be available while the computing device is connected to the communication network, and wherein automatically configuring the computing device according to the configuration information further comprises making unavailable those computing device features that should not be available while the computing device is connected to the communication network.

13. The method of claim 12, wherein the computing device features may include any one of software applications, hardware devices, system services and network services.

14. A computer-readable storage medium, having computer-readable instructions stored thereon, which when executed on a computer, carry out the method comprising:

detecting a change to the computer's current network connection; obtaining configuration information corresponding to the computer's current network connection;

automatically configuring the computer according to configuration information;

upon detecting the occurrence of a triggering event, the computer is automatically configured according to configuration information specifically associated with the triggering event, the triggering event comprises a predetermined geographical area, a particular date, a particular day of the week and a particular time of day; and upon detecting that the computer is no longer connected to a communication network, the computer configures itself according to default configuration information; and wherein the configuration information further includes an indicator identifying whether computer features not specifically identified in the configuration information should or should not be available while the computer is connected to the communication network, and wherein automatically configuring the computer according to the configuration information further comprises making available or unavailable computer features not specifically identified in the configuration information according to the indicator while the computer is connected to the communication network.

15. The method of claim 14, wherein the configuration information includes information identifying computer features that should be available while the computer is connected to the communication network, and wherein automatically configuring the computer according to the configuration information comprises making available those computer features that should be available while the computer is connected to the communication network.

16. The method of claim 15, wherein the configuration information further includes information identifying computer features that should not be available while the computer is connected to the communication network, and wherein automatically configuring the computer according to the configuration information further comprises making unavailable those computer features that should not be available while the computer is connected to the communication network.

17. The method of claim 16, wherein the computer features may include any one of software applications, hardware devices, system services and network services.

18. A method for automatically configuring a computing device according to a detected triggering event, the method comprising:

automatically detecting an occurrence of a triggering event;

selecting configuration information for the computing device previously associated with the detected triggering event;
configuring the computing device according to selected configuration information;
upon detecting that the computing device is no longer connected to a communication network, the computing device configures itself according to default configuration information; and
wherein the configuration information includes an indicator identifying whether computing device features not specifically identified in the configuration information should or should not be available while the computing device is connected to the communication network, and wherein automatically configuring the computing device according to the configuration information further comprises making available or unavailable computing device features not specifically identified in the configuration information according to the indicator while the computing device is connected to the communication network.

19. The method of claim 18, wherein the detected triggering event is the arrival of the computing device in a predetermined geographical area.

20. The method of claim 18, wherein the detected triggering event is the occurrence of a particular date.

21. The method of claim 18, wherein the detected triggering event is the occurrence of a particular day of the week.

22. The method of claim 18, wherein the detected triggering event is the occurrence of a particular time of day.

23. The method of claim 18, wherein the detected triggering event is a change in the detected network connection.

* * * * *